United States Patent
Jiang et al.

(10) Patent No.: US 11,943,065 B2
(45) Date of Patent: Mar. 26, 2024

(54) TECHNIQUES FOR RELIABLE CELLULAR COMMUNICATION

(71) Applicant: ZTE Corporation, Guangdong (CN)

(72) Inventors: Chuangxin Jiang, Guangdong (CN); Zhaohua Lu, Guangdong (CN); Yu Ngok Li, Guangdong (CN); Shujuan Zhang, Guangdong (CN); Zhen He, Guangdong (CN); Huahua Xiao, Guangdong (CN); Xinquan Ye, Guangdong (CN); Rongchen Sun, Guangdong (CN); Hao Wu, Guangdong (CN)

(73) Assignee: ZTE Corporation, Guangdong (CN)

(*) Notice: Subject to any disclaimer, the term of this patent is extended or adjusted under 35 U.S.C. 154(b) by 438 days.

(21) Appl. No.: 17/306,228

(22) Filed: May 3, 2021

(65) Prior Publication Data
US 2021/0297196 A1    Sep. 23, 2021

Related U.S. Application Data

(63) Continuation of application No. PCT/CN2018/113617, filed on Nov. 2, 2018.

(51) Int. Cl.
*H04L 1/1867* (2023.01)
*H04L 1/1829* (2023.01)

(52) U.S. Cl.
CPC .......... *H04L 1/1887* (2013.01); *H04L 1/1854* (2013.01); *H04L 1/1896* (2013.01)

(58) Field of Classification Search
None
See application file for complete search history.

(56) References Cited

U.S. PATENT DOCUMENTS

| 10,326,509 B2 | 6/2019 | Challa et al. |
| 10,693,598 B2 | 6/2020 | Li et al. |

(Continued)

FOREIGN PATENT DOCUMENTS

| CN | 107294667 A | 10/2017 |
| CN | 107660331 A | 2/2018 |

(Continued)

OTHER PUBLICATIONS

International Search Report and Written Opinion in International Application No. PCT/CN2018/113617, dated Jun. 27, 2019, 6 pages.

(Continued)

*Primary Examiner* — Phirin Sam
(74) *Attorney, Agent, or Firm* — Perkins Coie LLP (57) ABSTRACT

In one configuration, multiple TRPs, or base stations such a next generation node B (gNB) base stations send different transport blocks (TBs) to a user equipment (UE) at the same time or at different times. In another configuration, multiple base stations may send the same data at the same time to a UE. When the same data is being sent by multiple base stations to a UE, the UE must be notified by some mechanism. Disclosed herein are multiple mechanism for notifying the UE that multiple base stations will be transmitting toe same data at the same time. When there is a backhaul between a TRP and another, each TRP can choose to send the same data stream to increase the reliability of the transmission when, for example, the UE receives at a low signal-to-noise ratio (SNR).

20 Claims, 8 Drawing Sheets

(56) References Cited

U.S. PATENT DOCUMENTS

| | | | |
|---|---|---|---|
| 2014/0192734 A1 | 7/2014 | Ng et al. | |
| 2018/0123769 A1* | 5/2018 | Pelletier | H04L 5/0053 |
| 2018/0132158 A1 | 5/2018 | Tseng et al. | |
| 2018/0132264 A1 | 5/2018 | Jung et al. | |
| 2018/0199268 A1* | 7/2018 | Wang | H04L 5/0053 |
| 2019/0132834 A1* | 5/2019 | Yan | H04L 5/0032 |
| 2020/0213044 A1* | 7/2020 | Peng | H04L 1/1864 |
| 2021/0297196 A1* | 9/2021 | Jiang | H04L 5/0044 |
| 2021/0376988 A1* | 12/2021 | Papasakellariou | H04W 72/044 |
| 2023/0048797 A1* | 2/2023 | Karaki | H04W 72/0446 |

FOREIGN PATENT DOCUMENTS

| | | |
|---|---|---|
| CN | 108271434 A | 7/2018 |
| WO | 2018/144382 A2 | 8/2018 |

OTHER PUBLICATIONS

Apple, "Considerations on PDCCH design for NCJT" 3GPP TSG RAN WG1 Meeting #94bis, R1-1811124, Sep. 29, 2018 (Sep. 29, 2018), 6 pages.

AT&T, "Overview of Multi-TRP/Panel Enhancements" SGPP TSG RAN WG1 Meeting #94bis. R1-1810682, Sep. 29, 2018 (Sep. 29, 2018), 23 pages.

Huawei et al. "Enhancements on multi-TRP/panel transmission", 3GPP TSG RAN WG1 Meeting #94bis, R1-1810104. Sep. 29, 2018 (Sep. 29, 2018), 17 pages.

Chinese Notification to Complete Formalities of Registration for Chinese Patent Application No. 201880099184.8, dated Nov. 2, 2022. 6 pages with unofficial translation.

Chinese Office Action dated May 7, 2022 for Chinese Patent Application No. 201880099184.8. (21 pages).

\* cited by examiner

TECHNIQUES FOR RELIABLE CELLULAR COMMUNICATION

CROSS-REFERENCE TO RELATED APPLICATIONS

This application is a continuation of International Patent Application No. PCT/CN2018/113617, filed on Nov. 2, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity, connectivity, and reliability. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This document discloses methods, systems, and devices related to wireless communication. In one aspect a method of wireless communication is disclosed. The method includes receiving a first downlink control information (DCI) message to schedule a first shared resource and a second DCI message to schedule a second shared resource. The method further includes determining a relationship between first scheduling information indicated by the first DCI message and second scheduling information indicated by the second DCI message. The method includes determining whether a first transport block (TB) communicated by the first shared resource is associated with a second TB communicated by the second shared resource.

In another aspect a method of wireless communication is disclosed. The method includes sending a first downlink control information (DCI) message to schedule a first shared resource and sending a second DCI message to schedule a second shared resource. The method further includes determining a relationship between first scheduling information indicated by the first DCI message and second scheduling information indicated by the second DCI message. The method includes determining whether a first transport block (TB) communicated by the first shared resource is associated with a second TB communicated in the second shared resource.

The following features may be included in various combinations. A configurable number of bits in the second DCI message may determine when the first TB is associated with the second TB. The determining whether the first TB is associated with the second TB may depend on a relationship between the first scheduling information and the second scheduling information satisfying one or more predefined conditions. When the first TB is associated with the second TB, then a relationship between the first scheduling information and the second scheduling information may satisfy one or more predefined conditions. Determining whether the first TB is associated with the second TB may depend on a predetermined number of bits in the second DCI message and a relationship between the first scheduling information and the second scheduling information satisfying one or more predefined conditions. The first and/or second scheduling information may be indicated by at least one of the following parameters in the first and/or second DCI: a downlink assignment indicator (DAI), a hybrid automatic repeat request (HARQ) process number, a transmit power control (TPC) command for scheduled physical uplink control channel (PUCCH), a PUCCH resource indicator, a PDSCH-to-HARQ_feedback timing indicator, a time domain resource assignment, a radio network temporary identifier (RNTI), a carrier indicator, a bandwidth part indicator, a new data indicator (NDI), or a modulation and coding scheme (MCS). The one or more predefined conditions may include a first HARQ process number included in the first DCI message has a predetermined relationship with a second HARQ process number included in the second DCI message, wherein the second shared resource is before an acknowledgement message (ACK/NACK) for the first shared resource, and wherein the second shared resource is not before the first shared resource. The predetermined relationship may mean the same value. The one or more predefined conditions may further include: a first carrier indicator included in the first DCI message has the same value as a second carrier indicator included in the second DCI message, a first bandwidth part indicator included in the first DCI message has the same value as a second bandwidth part indicator included in the second DCI message, and a first NDI included in the first DCI message has a same value as a second NDI included in the second DCI message. The one or more predefined conditions may include the first shared resource and the second shared resource are transmitted in a same slot or in a same symbol. The one or more predefined conditions may include an acknowledgement message (ACK/NACK) for the first shared resource and another ACK/NACK for the second shared resource are transmitted in a same slot or in a same symbol. The one or more predefined conditions may include an first ACK/NACK for the first shared resource uses the same physical uplink control channel (PUCCH) resource or a resource set as a second ACK/NACK for the second shared resource. The one or more predefined conditions may include a transmit power control (TPC) command carried by the first DCI and the second DCI are the same. The one or more predefined conditions may include a radio network temporary identifier (RNTI) carried by the first DCI and the second DCI are the same. The one or more predefined conditions include a transport block size (TBS) carried by the first DCI and the second DCI are the same. Transmission configuration indicator (TCI) configurations by radio resource control (RRC) signaling or medium access control (MAC) control element (CE) are independent for the first shared resource and the second shared resource. The one or more predefined conditions may include that a MCS value carried by the second DCI should not be one of A-31 if another MCS value carried by the second DCI is one of 0-(A-1), wherein A has a value of 28 or 29.

DETAILED DESCRIPTION

Section headings are used in the present document only to improve readability and do not limit scope of the disclosed embodiments and techniques in each section to only that section.

With the development of wireless communication technologies, the performance including transmission rate, delay, throughput, and reliability has been improved through various technologies. However, to achieve high-performance wireless transmission, user equipment (also referred to as a terminal or UE) must perform more complex processing to meet the performance requirements. For example, a UE that detects a larger control channel bandwidth is subject to more complex control information including data encoding, decoding processing, and the like. A UE that operate at high frequencies may use a large bandwidth to achieve a high data rate or high-capacity transmission. This may use more computational resources which may result in high power consumption.

In Release-15, the NR (new radio), the multi-transmission reception points (TRP) joint transmission does not support data transmission by the same user by multiple TRPs. For the ultra-reliable low-latency communication (URLLC) service, techniques are disclosed herein for using multi-TRP transmission for improved reliability.

In one configuration, multiple TRPs, or base stations such a next generation node B (gNB) base stations send different transport blocks (TBs) to a user equipment (UE) at the same time or at different times. In another configuration, multiple base stations may send the same data at the same time to a UE. When the same data is being sent by multiple base stations to a UE, the UE must be notified by some mechanism. Disclosed herein are multiple mechanism for notifying the UE that multiple base stations will be transmitting the same data at the same time.

Figure 1:
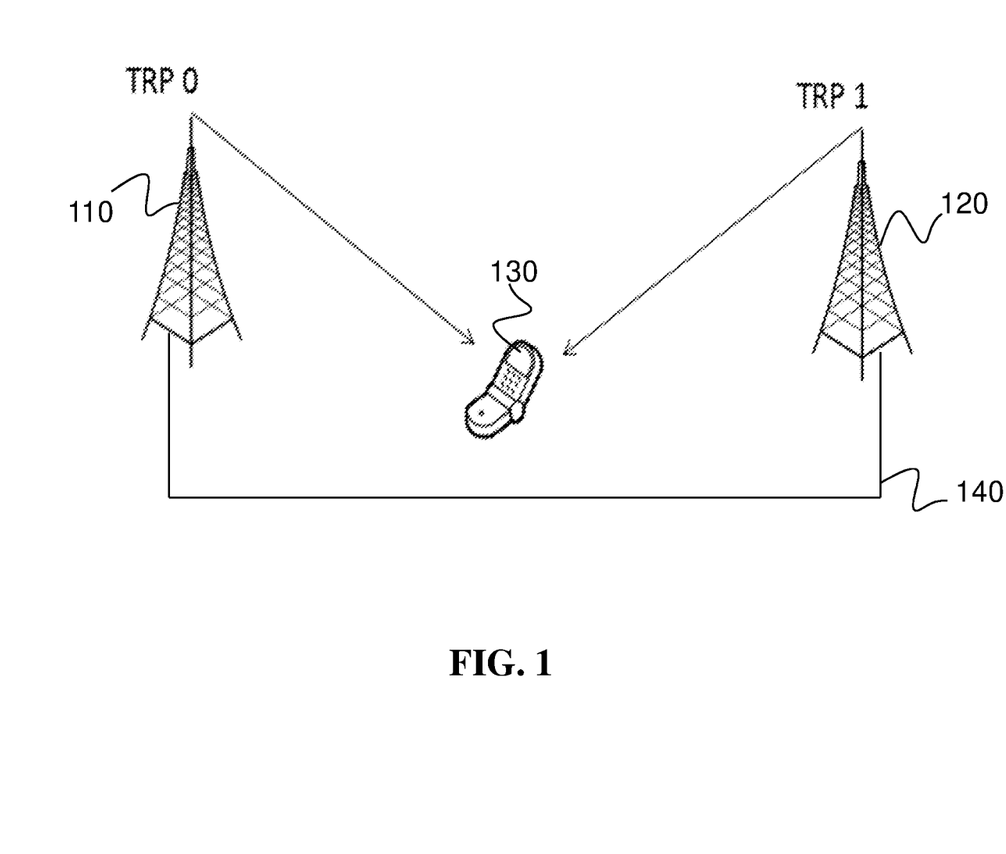
FIG. 1 depicts a system, in accordance with some example embodiments.

NR release 15 does not specify a multi-TRP transmission scheme. As shown in FIG. 1, TRP 0 110 and TRP 1 120 may transmit data to the same UE 130, which can be on the same time unit or on different time units.

When there is a backhaul 140 between TRP 0 110 and TRP 1 120, TRP 0 110 and TRP 1 120 can choose to send the same data stream to increase the reliability of the transmission when, for example, the UE receives at a low signal-to-noise ratio (SNR). In the case of high SNR, TRP 0 110 and TRP 1 120 can choose to send different data streams to increase the transmission capacity.

Figure 2:
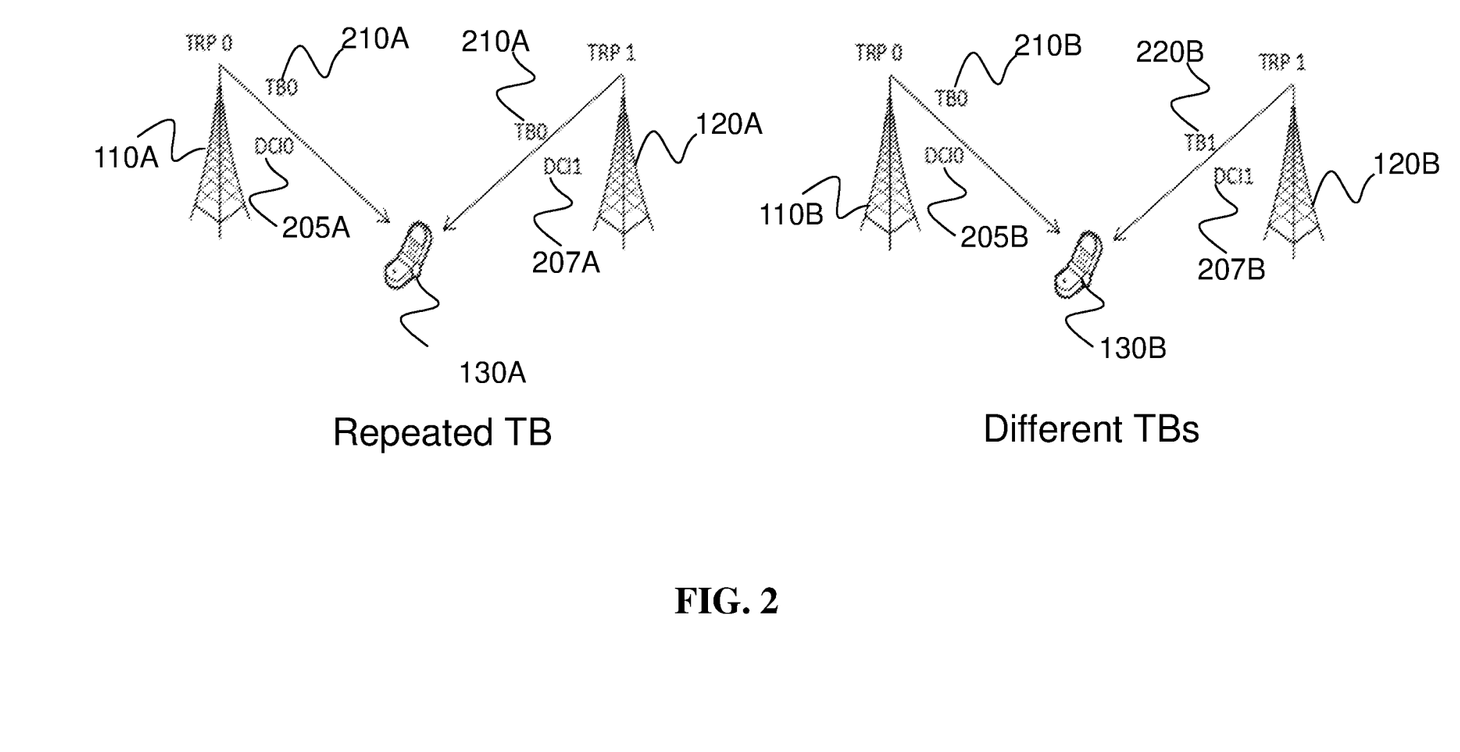
FIG. 2 depicts two systems, in accordance with some example embodiments.

Referring to FIG. 2, when doing multi-TRP transmission, TRP 0 110A may send one physical downlink control channel (PDCCH) with downlink control information (DCI) 0 205A, and TRP 1 120A may send one PDCCH with DCI 1 207A. DCI 0 205A schedules one physical downlink shared channel (PDSCH) 0, and DCI 1 207A schedules another PDSCH 1. At a low SNR, the two base stations 110A and 120A (eNBs or gNBs) can choose to schedule the same transmission block (TB). In this case, PDSCH 0 scheduled by DCI 0 205A and PDSCH 1 scheduled by DCI 1 207A correspond to the same TB, TB0 210A. Even if the channel conditions of the UE 130A are not so good, the UE 130A can jointly demodulate two identical TBs (TB0 210A), which will increase the probability of correct demodulation. In the case of a high SNR, the two base stations 110B and 120B can choose to schedule different TBs, that is, PDSCH0 scheduled by DCI0 205B and PDSCH1 scheduled by DCI1 207B correspond to different TBs, TB0 210B and TB1 220B. At this time, if the channel conditions of the UE are good and each TB can be demodulated correctly, the system capacity will be increased.

For uRLLC services, the reliability of transmission must be very high because these services are essential such as providing emergency services. If TRP0 and TRP1 can transmit the same or related data, the probability that the UE receives the correct data is increased, thereby increasing the transmission reliability and reducing the transmission delay which could be caused by retransmissions when the SNR is low. However, even for uRLLC services, multi-TRP transmission may not possible at every time, and it is not necessary for each TRP to transmit the same or related data at every time. For example, in the case of high channel quality, TRP0 and TRP1 can transmit different data streams or transmission blocks to increase transmission capacity. In the case of low channel quality, TRP0 and TRP1 can transmit the same or related data to increase reliability. The most flexible solution is to support dynamic switching between multi-TRP transmission and single TRP transmission, and to support dynamic switching between repeated TBs and non-repeated TBs transmitted by the multiple TRPs during multi-TRP transmission.

The disclosed solutions can be broken into three categories. In a first category, one field in a DCI indicates to the UE whether the PDSCH scheduled by this DCI is associated with one PDSCH scheduled by another DCI. In a second category, dedicated bits in the DCI field can be used to indicate whether the PDSCH scheduled by the DCI is associated with a PDSCH scheduled by another DCI. In a third category, if the scheduling information carried by DCIx and DCIy are associated, PDSCHx and PDSCHy are associated. These categories are described below. "x" and "y" are used herein to indicate two DCIs and two PDSCHs.

First Category

In some example embodiments, one field is introduced in a DCI to indicate to the UE whether the PDSCH scheduled by the DCI is associated with a PDSCH scheduled by another DCI. Two associated PDSCHs means transmission data from two PDSCHs are not independent. The UE can perform combining and detection for the two PDSCHs. For the two associated PDSCHs, the UE can feedback one combined acknowledgement message (ACK/NACK or A/N). For example, when TB0 and TB1 are from PDSCH0 and PDSCH 1 respectively and PDSCH0 and PDSCH 1 are associated, the UE may feedback one bit A/N for these two PDSCH. In another example, TB0, TB1 may be from PDSCH0, and TB2 and TB 3 are from PDSCH1. When PDSCH0 and PDSCH1 are associated, TB0 and TB2 are associated, and TB1 and TB3 are associated. Then, the UE only need feedback one bit A/N for TB0 and TB2, and 1 bit A/N for TB1 and TB3. Two associated PDSCHs means the TBs included in the two PDSCH are the same.

The field can include one bit in DCIx. The one bit may be used to indicate the relationship between PDSCHx scheduled by DCIx and PDSCHy scheduled by another DCIy. The base station can use higher layer signaling to set up the relationship between DCIx and DCIy, e.g. the gNB higher layer configures one group_index in each CORESET or search space, or search space set. If the two CORESETs/ search spacse/search space sets for DCIx and DCIy are configured with the same group_index, PDSCHx scheduled by DCIx and PDSCHy scheduled by DCIy may or may not have the association. In this case, if the value of the new field is set to 1 for DCIy, PDSCHy and the most recent PDSCHx are associated. And if the value of the new field is set to 0 for DCIy, PDSCHy and the most recent PDSCHx are not associated. However, if the two CORESET/search space/ search space set for DCIx and DCIy are configured with different group_index, PDSCHx scheduled by DCIx and PDSCH y scheduled by DCIy are not associated.

DCIx and DCIy can be in the same bandwidth part (BWP) or carrier components (CC). Alternatively, DCIx and DCIy can be in different BWP or CC. Similarly, PDSCHx and PDSCHy can be the same or different CC/BWP. If PDSCHx and PDSCHy are limited within one CC or BWP, setting up the possible relationship by higher layer signaling is unnecessary. One bit field is used to indicate the relationship between PDSCHx and PDSCHy which is in the same CC or BWP.

This field can also include more than 1 bit. In this case, gNB can use higher layer signaling to set up the relationship between several DCIs. For one PDSCH transmission scheduled by DCIx, this field may indicate whether PDSCHx is associated with another PDSCHi, and indicate a value for i. For instance, DCIx, DCIy, DCIz, DCIm have potential relationships which are configured by radio resource control (RRC) signaling or medium access control (MAC) control element (CE) or MAC-CE. A two-bit field may be included in DCIx, where 00 means no association between PDSCHx and PDSCH scheduled by another DCI, 01 means PDSCHx is associated with PDSCHy, 02 means PDSCHx is associated with PDSCHz scheduled by DCIz, 03 means PDSCHx is associated with PDSCHm scheduled by DCIm. Since scheduling can happen in every slot, the associated PDSCHy, z, and m can be restricted as the same slot with PDSCHx.

The above technique uses DCI bits to indicate whether multiple PDSCH scheduled by multiple DCI are associated or not. Different DCI can be from different TRP or serving cell or CC.

If multiple PDSCH are associated, it is enough for UE to correctly detect any one of these associated PDSCH. In order to save feedback overhead, one combined A/N feedback is enough (1 bit in the case of one TB per PDSCH, 2 bits in the case of two TBs per PDSCH). The A/N feedback slot can be the same for these associated PDSCH.

Figure 3:
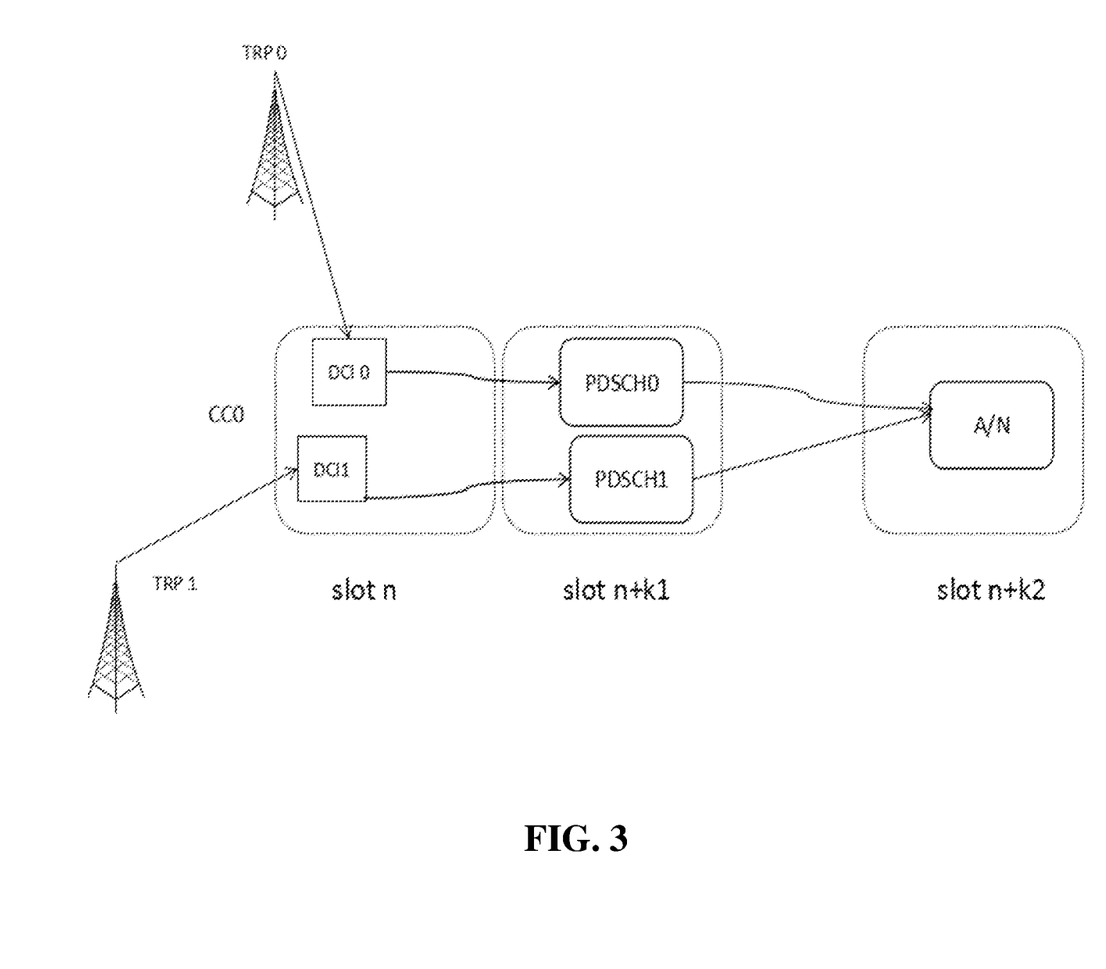
FIG. 3 depicts two transmission-reception points (TRPs) transmitting two independent physical downlink control channels (PDCCHs), in accordance with some example embodiments.

As shown in FIG. 3, the slot of A/N feedback for PDSCH0 can be the same as the slot of A/N feedback for PDSCH1 if the PDSCH0 and PDSCH1 are associated. As shown in FIG. 3, two TRPs transmit two independent PDCCHs.

The PUCCH resource for A/N feedback for PDSCH0 can be the same as that for PDSCH1 which results in feedback overhead that is reduced. In this case, a TPC indication by DCI may also be the same in DCI0 and DCI1 since PDSCH0 and 1 carry the same TBs.

Two associated PDSCH can be restricted within one slot in order to reduce the transmission latency for URLLC traffic. In this case, the UE can do the soft combining of PDSCH 0 and PDSCH 1 at the same slot with improved data reliability.

Figure 4A:
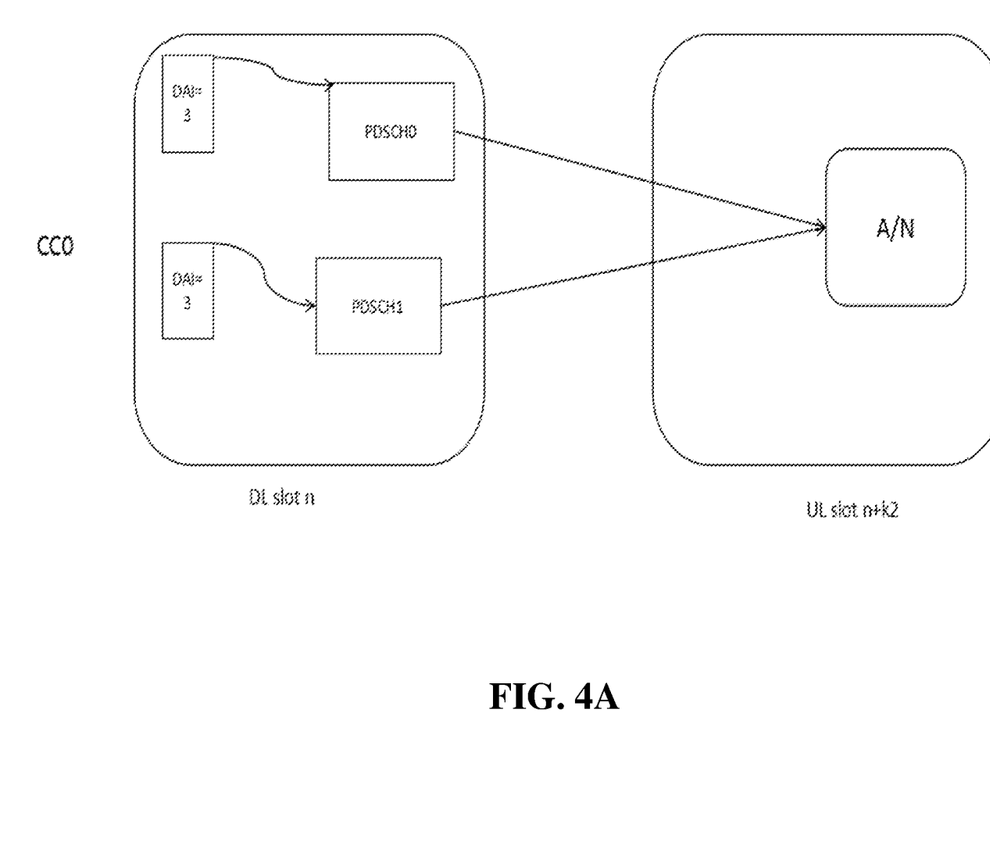
FIG. 4A depicts two TRPs transmitting two independent PDCCHs with the same downlink assignment indicator (DAI), in accordance with some example embodiments.

As noted above, if the PDSCH 0 and PDSCH 1 are associated, data transmission is successful when the UE can detect one of the two PDSCHa. Therefore, the downlink assignment indicator (DAI) counter and/or DAI total in DCI 0 and DCI 1 can be the same if DCI 0 and DCI 1 are in the same slot, BWP and scrambled by the same radio network temporary identifier (RNTI). As shown in FIG. 4A, the DAI counter is the same for DCI 0 and DCI1. FIG. 4A depicts two TRPs transmitting two independent PDCCH with the same DAI.

Repetition in two PDSCHs may be used for uRLLC traffic, so the two PDCCH may be scrambled by the same RNTI, e.g. MCS-C-RNTI, or C-RNTI.

Further restriction can be done for hybrid automatic repeat request (HARQ) process ID for the two associated PDSCH, e.g. the same HARQ process ID.

Based on above description, one technique is to use explicit DCI bits to indicate whether multiple PDSCHs scheduled by multiple DCIs are associated. If the multiple PDSCH scheduled by the DCIs are associated, the contents of the multiple DCI are not independent.

Some parameter values of the DCI are associated. The parameters that may be used to indicate association include one or more: DAI, HARQ process number, TPC command for scheduled PUCCH, PUCCH resource indicator, PDSCH-to-HARQ_feedback timing indicator, Time domain resource assignment, RNTI, carrier indicator, and/or bandwidth part indicator.

When the scheduling information carried by two DCI is associated, then the scheduling information carried by the two DCI satisfies some predefined conditions.

If some parameter values of two DCI are associated, the parameter values do not need to be the same, but they do have some relationship. For example, DCI0 and DCI 1 are associated, then the time-domain resource assignment for PDSCH 0 and PDSCH 1 does not need to be the same, but the values should ensure PDSCH 0 and PDSCH 1 are transmitted in the same slot.

A carrier indicator and bandwidth part indicator can ensure the two PDSCHs are transmitted in the same BWP.

Two PDSCHs carrying associated TB(s) requires TBS(s) carried by the associated PDSCHs are the same or similar. For instance, the TBS for both PDSCH0 and PDSCH1 are the same.

Second Category

Above in category 1, DCI bits are used to indicate whether two PDSCHs are associated. There is some association between two DCIs when two PDSCHs are associated. Another technique is described below.

gNB uses explicit DCI bits and the association between two DCIs to inform a UE whether PDSCHs scheduled by the two DCIs are associated. In other words, when both explicit DCI field values and the association between the two DCIs is satisfied, then the two PDSCHs are associated. If the value of the new field in DCIX is 1, and some parameter values of DCIx and DCIy are associated, then PDSCHx and PDSCHy are associated. The parameters include one or more of: DAI, HARQ process number, TPC command for scheduled PUCCH, PUCCH resource indicator, PDSCH-to-HARQ_feedback timing indicator, time domain resource assignment, RNTI, carrier indicator, bandwidth part indicator. Otherwise, PDSCHx and PDSHy may not be associated.

For instance, when the 1 bit field in DCIx is 1, and the following conditions are the same in DCIx and DCIy: the same HARQ process number, the same RNTI, the same TPC command, PDSCH-to-HARQ_feedback timing indicators of the two DCI should ensure the two A/N feedback in the same slot.

Another condition may be added such as the TBS(s) for the two PDSCH are the same. In this case, the TB(s) from the two TRP are the same, and the UE can do soft combining at the receiver.

Third Category

The above techniques can support dynamic selection between TRPs sending the same TB and TRPs sending different TBs. These techniques use some DCI overhead.

Another technique is to use an implicit way to indicate the two PDSCHs scheduled by two DCIs are associated. As described in the above two categories, if the scheduling information carried by DCIx and DCIy are associated, PDSCHx and PDSCHy are associated.

If two PDSCH are associated, the UE can perform combined detection of the two PDSCHs because the TBs carried by two PDSCHs are the same.

If the scheduling information carried by two DCI is associated, the scheduling information carried by the two DCI satisfy some conditions. The scheduling information at least derived from one or more of following parameters: DAI, HARQ process number, TPC command for scheduled PUCCH, PUCCH resource indicator, PDSCH-to-HARQ_feedback timing indicator, time-domain resource assignment, RNTI, carrier indicator, bandwidth part indicator, and/or new data indicator (NDI).

In addition, TBS(s) of PDSCHx and PDSCHy may be the same or the difference of TB(s) of PDSCHx and PDSCHy is smaller than a threshold.

Since two DCIs and corresponding PDSCHs may be transmitted from different TRPs, some higher layer configurations may be independent. For example, TCI configuration by RRC signaling or MAC-CE to PDSCHx and PDSCHy may be independent because two TRPs' locations are different, so QCL (Quasi co-location) information from the two TRPs to the UE may be different. So, TCI State configurations by RRC signaling or MAC CE for PDSCHx and PDSCHy may be independent. Similarly, some other configurations for PDSCHx and PDSCHy may be independent, or some other configurations for PDCCHx and PDCCHy may be independent. Although PDSCHx and PDSCHy, or PDCCHx and PDCCHy are in the same CC or BWP, they may be from different TRPs, like different cells, the higher layer configurations may be independent. Those mentioned configurations may be configured by RRC signaling or MAC-CE. For example: PDCCH-config are independent for PDCCHx and PDCCHy; control resource set or search space are independent for PDCCHx and PDCCHy; and/or PDSCH-config are independent for PDSCHx and PDSCHy.

In example condition 1, at least one of carrier indicator, bandwidth part indicator in DCIX and DCIy are the same. In another example, the condition can be that CC (component carrier) and BWP in DCIx and DCIy have a predefined relationship. For example, base station use higher layer signaling to set up the relationship between two CCs or BWPs which carry DCIX and DCIy respectively. These two CCs or BWPs can be from different CC groups or BWP groups. These two CCs/BWPs may overlap in frequency range.

In example condition 2, HARQ process number carried by DCIx and DCIy are the same. The HARQ process number by DCIx and DCIy may satisfy one predefined condition, e.g. HARQ process number for PDSCHx+ HARQ process number for PDSCHy=8. The predefined condition means some rules are known at both transmit side and receive side in advance.

Figure 4B:
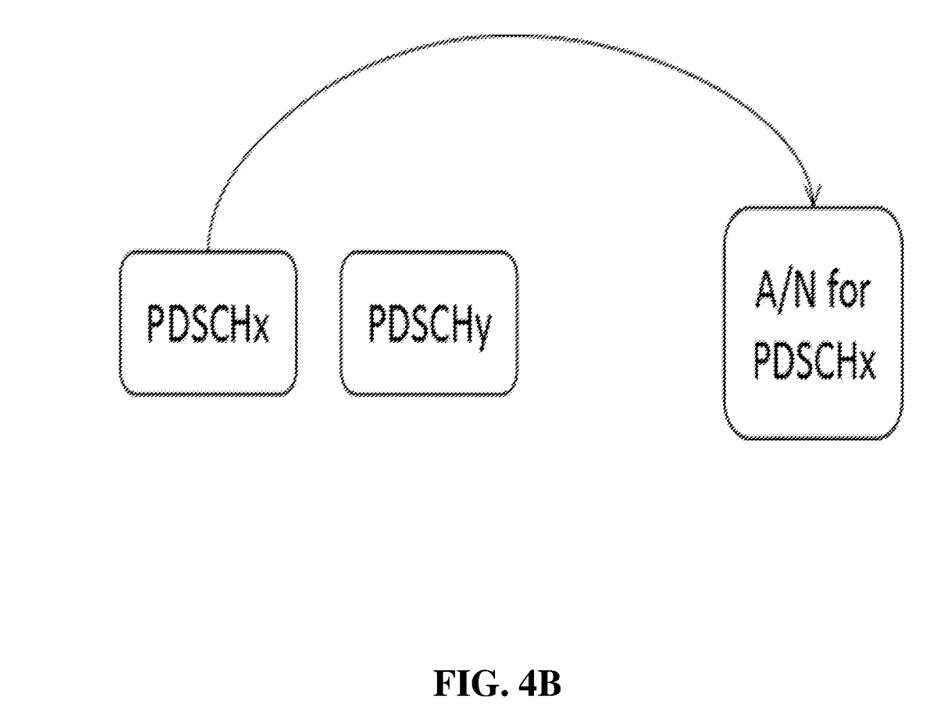
FIG. 4B depicts two PDSCHs and an acknowledgement for one of the PDSCHs, in accordance with some example embodiments.

In example condition 2a based on condition 2: HARQ process number carried by DCIx and DCIy are the same, PDSCHy transmission is before A/N feedback of PDSCHx, PDSCHy transmission is not before PDSCHx transmission. In the current standard, the procedure in FIG. 4B is not supported when PDSCHx and PDSCHy carry the same TB and they use the same HARQ process number. In other words, PDSCHy should be transmitted after A/N for PDSCHx. If NACK is reported by the UE, then PDSCHx was not detected correctly at the UE. Then the same TB can be transmitted but will increase the transmission latency. In order to reduce the latency, TRP0 can transmit PDSCHx first, and TRP1 can transmit PDSCHy before A/N feedback for PDSCHx. Then the UE can perform joint detection of PDSCHx and PDSCHy. Since PDSCHx and PDSCHy are associated, the probability of correct detection will be increased. One combined A/N can be fed back. Some higher layer configurations may be independent for PDSCHx and PDSCHy or for PDCCHx and PDCCHy. After A/N feedback of PDSCHx, PDSCHy carries the same TB(s) with PDSCHx can still be transmitted. This is re-transmission which is same as the traditional procedure, wherein MCS value may be one of 28, 29, 30, 31 if the maximum modulation order is 8, or may be one of 29,30,31 if the maximum modulation order is 6.

In example condition 2b, some higher layer configurations may be independent for PDSCHx and PDSCHy or for PDCCHx and PDCCHy.

PDSCHy transmission is before than S symbols of A/N feedback of PDSCHx. S is an integer value for conditions 1 and 2, 2a, and 2b above.

A further condition 3 may be included in condition 1 and 2: TBS(s) of PDSCHx and PDSCHy are the same. It is noted that TBS is derived by scheduling information including some indicated by DCI, e.g. MCS, time-domain resource assignment, frequency domain resource assignment, ZP CSI-RS trigger and rate matching indicator and some configured by higher layer parameters. Alternatively, for condition 3 the difference between the TBS(s) of PDSCHx and PDSCHy may be smaller than a threshold. If PDSCHx is an initial transmission, the MCS value in DCIx may be ranged from 0-28 if the maximum modulation order is 6 (64 QAM) or ranged from 0-27 if the maximum modulation order is 8 (256QAM), then PDSCHy may also be an initial transmission and the MCS value in DCIy should not be ranged from 28, 29, 30, 31 if the maximum modulation order is 8, or should not be one of 29,30,31 if the maximum modulation order is 6. In other words, one more condition 3a can be: If PDSCHx are traditional re-transmission transmissions, the MCS value in DCIX is ranged from 29-31 and if maximum modulation order is 6 (64 QAM) or ranged from 28-31 if maximum modulation order is 8 (256QAM), then PDSCHy may also be a re-transmission, the MCS value in DCIy may not be ranged from 0-27 if the maximum modulation order is 8, or may not be ranged from 0-28 if the maximum modulation order is 6. Then, successful detection of one of pair (DCIx, PDSCHx) and (DCIy, PDSCHy) is enough since both DCIX and DCIy contain the complete scheduling MCS information. If the traditional procedure is used, PDSCHy is as a re-transmission of PDSCHx, MCS value of PDSCHy is in a range of 29-31 or 28-31, PDSCHy and DCIy are unusable if DCIx is not detected correctly.

Condition 3a may be: if a MCS value in DCIx is ranged 0-A, MCS value in DCIy may also be in range 0-(A-1). A can be 29. Alternatively, A can be 28. If the MCS value in DCIx is ranged A-31, MCS value in DCIy may also be in range A-31.

Based on the condition 1 or 2, two TRPs can transmit the same TBs in the same slot or very adjacent slot. The UE can perform soft combing for joint detection resulting in improved data reliability. In this case, condition 3b can be: NDI value carried by DCIx and DCIy may be the same since they schedule the same TB(s).

In example condition 4, PDSCHx and PDSCHy may be transmitted in the same slot or same symbol. This will further reduce the transmission latency.

Example condition 4a can be included in condition 4 where a DAI total or counter carried by DCIx and DCIy satisfy a special condition or are the same.

Example condition 5 can be included in conditions 1,2 where A/N feedback for the PDSCHx and PDSCHy may be transmitted at the same slot or same symbol. This will further reduce the transmission latency.

Further condition 6 can be included in condition 5: PUCCH resource of A/N feedback for the PDSCHx and PDSCHy may be the same. This will reduce the uplink feedback overhead but may impact the reliability of A/N transmissions.

Further condition 6a can be included in condition 6: TPC command for scheduled PUCCH carried by DCIx and DCIy should be the same.

Further condition 7 can be included in condition 1,2,3: RNTI of DCIx and DCIy should be the same.

Any conditions mentioned above can be combined as a new condition. For example, a final condition may include condition 1+2a+2b+3a.

If time domain resources and frequency domain resources are not exactly same for PDSCHx and PDSCHy, it is hard to ensure the TBSs are the same. gNB can use DCI signaling to adjust TBS for PDSCHx or PDSCHy. An offset value can be indicated by the DCI. Alternatively, RRC or MAC signaling can be used to further adjust TBS.

Figure 5:
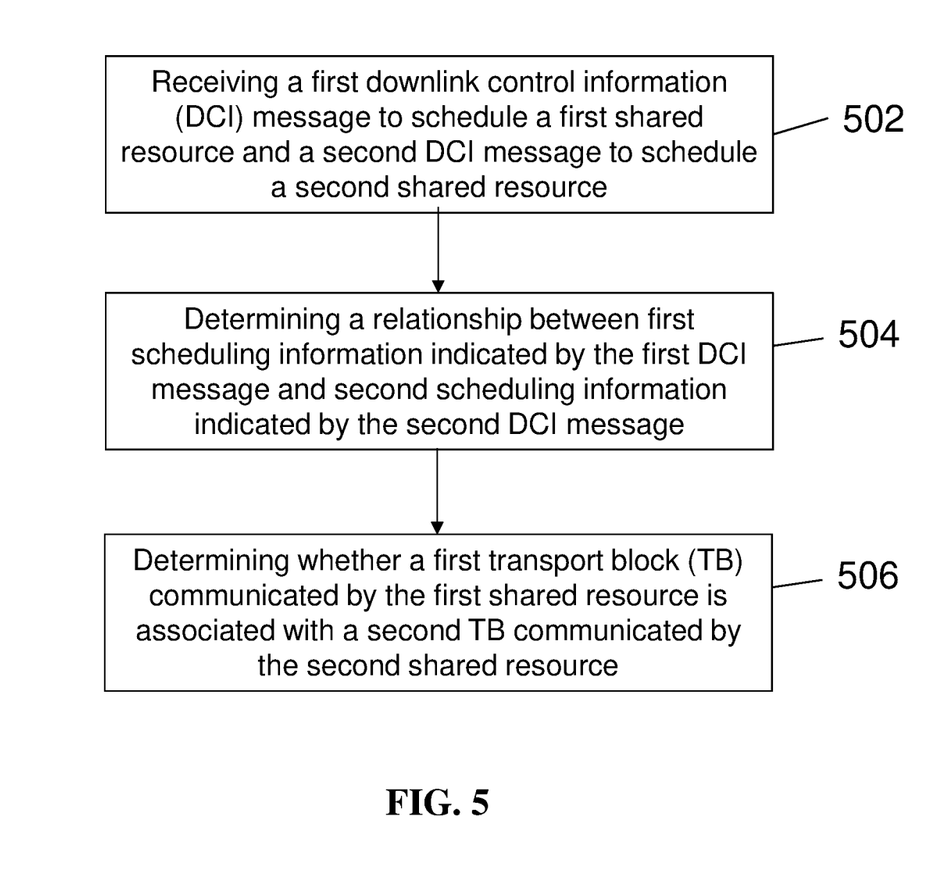
FIG. 5 depicts a process, in accordance with some example embodiments.

FIG. 5 depict a process, in accordance with some example embodiments. The process includes a method of wireless communication. At 502, the method includes receiving a first downlink control information (DCI) message to schedule a first shared resource (e.g., a first PDSCH) and a second DCI message to schedule a second shared resource (e.g., a second PDSCH). At 504, method includes determining a relationship between first scheduling information indicated by the first DCI message and second scheduling information indicated by the second DCI message. At 506, the method includes determining whether a first transport block (TB) communicated by the first shared resource is associated with a second TB communicated by the second shared resource. The determining the first TB is associated with the second TB may depend on a relationship between the first scheduling information and the second scheduling information satisfying one or more predefined conditions.

Although above examples may be used for downlink transmission, the same solutions can also be used for uplink transmissions. For uplink transmissions, DCIx and DCIy schedule PUSCHx and PUSCHy respectively. In the above conditions, PDSCH is replaced by PUSCH, TCI is replaced by SRI (SRS resource indicator), or spatial related information.

Figure 6:
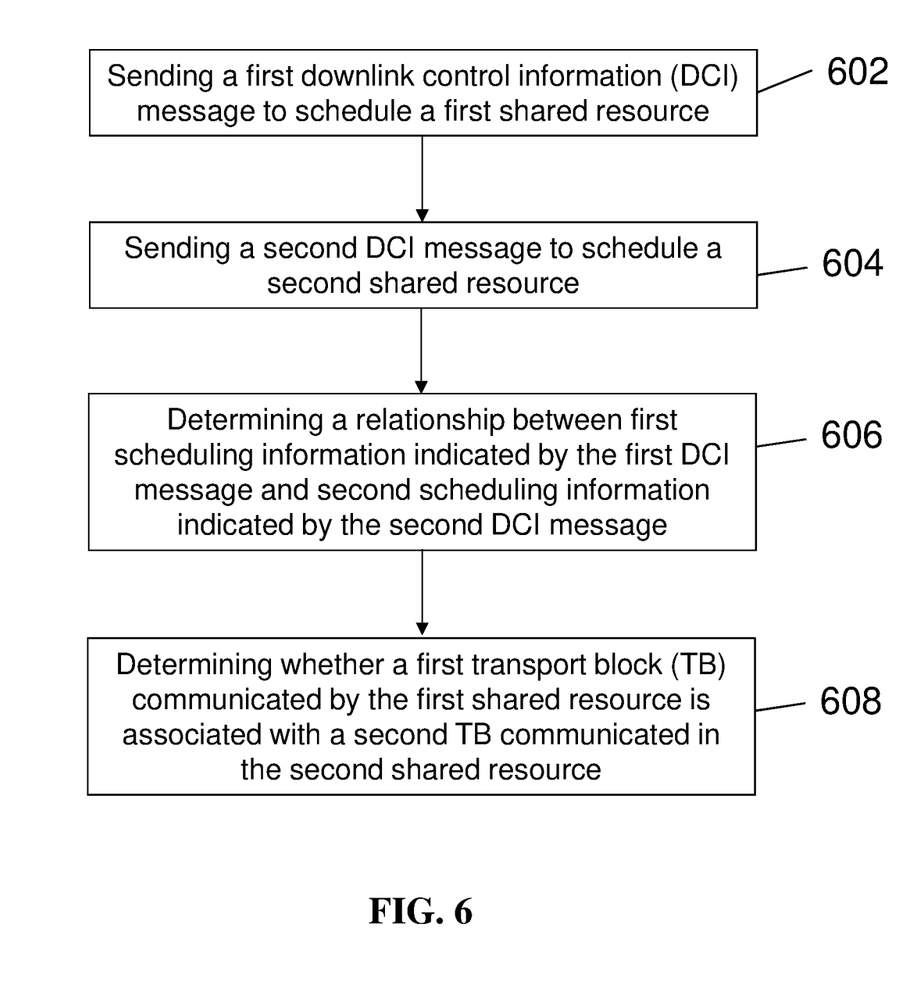
FIG. 6 depicts another process, in accordance with some example embodiments.

FIG. 6 depicts another process, in accordance with some example embodiments. The process includes a method of wireless communication. At 602, the method includes sending a first downlink control information (DCI) message to schedule a first shared resource, the first shared resource may be a physical downlink shared channel (PDSCH). At 604, the method includes sending a second DCI message to schedule a second shared resource, the second shared resource may be a PDSCH. At 606, the method includes determining a relationship between first scheduling information indicated by the first DCI message and second scheduling information indicated by the second DCI message. At 608, the method includes sending a first transport block (TB) communicated by the first shared resource associated with a second TB communicated in the second shared resource. The determining the first TB is associated with the second TB may depend on a relationship between the first scheduling information and the second scheduling information satisfying one or more predefined conditions.

Figure 7:
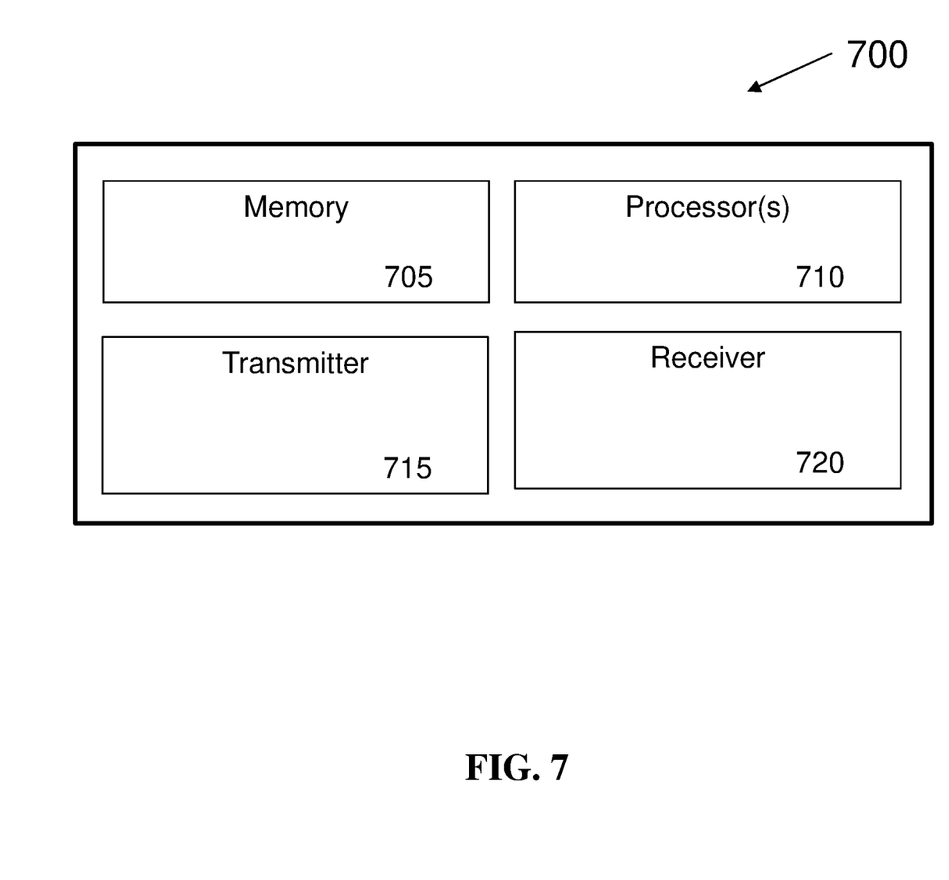
FIG. 7 depicts an apparatus, in accordance with some example embodiments.

FIG. 7 depicts a block diagram 700 representing of a portion of a radio station. A radio station 700 such as a base station or a wireless device (or UE) can include one or more processors 710 such as a microprocessor that implements one or more of the wireless techniques presented in this document. The radio station 700 can include transmitter electronics 715 to send and receiver electronics 720 to receive wireless signals over one or more communication interfaces such as an antenna. The radio station 700 can include other communication interfaces for transmitting and receiving data. Radio station 700 can include one or more memories 705 configured to store information such as data and/or instructions. In some implementations, the processor electronics 710 can include at least a portion of the transceiver electronics 720/715. In some embodiments, at least some of the disclosed techniques, modules or functions are implemented using the radio station 700.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:
   receiving a first downlink control information (DCI) message to schedule a first shared resource and a second DCI message to schedule a second shared resource;
   determining a relationship between first scheduling information indicated by the first DCI message and second scheduling information indicated by the second DCI message; and
   determining whether a first transport block (TB) communicated by the first shared resource is associated with a second TB communicated by the second shared resource,
   wherein the determining whether the first TB is associated with the second TB depends on a relationship between the first scheduling information and the second scheduling information satisfying one or more predefined conditions.

2. The method of claim 1, wherein a configurable number of bits in the second DCI message determines whether the first TB is associated with the second TB.

3. The method of claim 1, wherein the first and/or second scheduling information is indicated by at least one of the following parameters in the first and/or second DCI:
   a downlink assignment indicator (DAI), a hybrid automatic repeat request (HARD) process number, a transmit power control (TPC) command for scheduled physical uplink control channel (PUCCH), a PUCCH resource indicator, a physical downlink shared channel (PDSCH)-to-HARQ_feedback timing indicator, a time domain resource assignment, a radio network temporary identifier (RNTI), a carrier indicator, a bandwidth part indicator, a new data indicator (NDI), or a modulation and coding scheme (MCS).

4. The method of claim 3, wherein the one or more predefined conditions include a first HARQ process number included in the first DCI message has a predetermined relationship with a second HARQ process number included in the second DCI message, wherein the second shared resource is before an acknowledgement message (ACK/NACK) for the first shared resource, and wherein the second shared resource is not before the first shared resource.

5. The method of claim 4, wherein the predetermined relationship means the same value.

6. The method of claim 3, wherein the one or more predefined conditions include an first ACK/NACK for the first shared resource uses the same physical uplink control channel (PUCCH) resource or a resource set as a second ACK/NACK for the second shared resource.

7. The method of claim 3, wherein the one or more predefined conditions includes that a MCS value carried by the second DCI should not be one of A-31 if another MCS value carried by the second DCI is one of 0-(A-1), wherein A has a value of 28 or 29.

8. The method of claim 1, wherein the one or more predefined conditions include a transport block size (TBS) carried by the first DCI and the second DCI are the same.

9. The method of claim 1, wherein transmission configuration indicator (TCI) configurations by radio resource control (RRC) signaling or medium access control (MAC)

control element (CE) are independent for the first shared resource and the second shared resource.

10. A method of wireless communication, comprising:
sending a first downlink control information (DCI) message to schedule a first shared resource;
sending a second DCI message to schedule a second shared resource;
determining a relationship between first scheduling information indicated by the first DCI message and second scheduling information indicated by the second DCI message; and
determining whether a first transport block (TB) communicated by the first shared resource is associated with a second TB communicated in the second shared resource,
wherein the determining whether the first TB is associated with the second TB depends on a relationship between the first scheduling information and the second scheduling information satisfying one or more predefined conditions.

11. The method of claim 10, wherein a predetermined number of bits in the second DCI message indicate whether the first TB is associated with the second TB.

12. The method of claim 10, wherein the one or more predefined conditions include a transport block size (TBS) carried by the first DCI and the second DCI are the same.

13. The method of claim 10, wherein the first and/or second scheduling information is indicated by at least one of the following parameters in the first and/or second DCI:
a downlink assignment indicator (DAI), a hybrid automatic repeat request (HARQ) process number, a transmit power control (TPC) command for scheduled physical uplink control channel (PUCCH), a PUCCH resource indicator, a physical downlink shared channel (PDSCH)-to-HARQ_feedback timing indicator, a time domain resource assignment, a radio network temporary identifier (RNTI), a carrier indicator, a bandwidth part indicator, a new data indicator (NDI), or a modulation and coding scheme (MCS).

14. A wireless communication apparatus comprising:
at least one processor and memory containing instructions that when executed perform operations comprising:
receiving a first downlink control information (DCI) message to schedule a first shared resource and a second DCI message to schedule a second shared resource;
determining a relationship between first scheduling information indicated by the first DCI message and second scheduling information indicated by the second DCI message; and
determining whether a first transport block (TB) communicated by the first shared resource is associated with a second TB communicated by the second shared resource,
wherein the determining whether the first TB is associated with the second TB depends on a relationship between the first scheduling information and the second scheduling information satisfying one or more predefined conditions.

15. The apparatus of claim 14, wherein a configurable number of bits in the second DCI message determines whether the first TB is associated with the second TB.

16. The apparatus of claim 14, wherein the one or more predefined conditions include a transport block size (TBS) carried by the first DCI and the second DCI are the same.

17. The apparatus of claim 14, wherein the first and/or second scheduling information is indicated by at least one of the following parameters in the first and/or second DCI:
a downlink assignment indicator (DAI), a hybrid automatic repeat request (HARQ) process number, a transmit power control (TPC) command for scheduled physical uplink control channel (PUCCH), a PUCCH resource indicator, a physical downlink shared channel (PDSCH)-to-HARQ_feedback timing indicator, a time domain resource assignment, a radio network temporary identifier (RNTI), a carrier indicator, a bandwidth part indicator, a new data indicator (NDI), or a modulation and coding scheme (MCS).

18. A wireless communication apparatus comprising:
at least one processor and memory containing instructions that when executed perform operations comprising:
sending a first downlink control information (DCI) message to schedule a first shared resource;
sending a second DCI message to schedule a second shared resource;
determining a relationship between first scheduling information indicated by the first DCI message and second scheduling information indicated by the second DCI message; and
determining whether a first transport block (TB) communicated by the first shared resource is associated with a second TB communicated in the second shared resource,
wherein the determining whether the first TB is associated with the second TB depends on a relationship between the first scheduling information and the second scheduling information satisfying one or more predefined conditions.

19. The apparatus of claim 18, wherein a predetermined number of bits in the second DCI message indicate whether the first TB is associated with the second TB.

20. The apparatus of claim 18, wherein the one or more predefined conditions include a transport block size (TBS) carried by the first DCI and the second DCI are the same.

* * * * *

UNITED STATES PATENT AND TRADEMARK OFFICE
CERTIFICATE OF CORRECTION

PATENT NO. : 11,943,065 B2
APPLICATION NO. : 17/306228
DATED : March 26, 2024
INVENTOR(S) : Chuangxin Jiang et al.

It is certified that error appears in the above-identified patent and that said Letters Patent is hereby corrected as shown below:

On the Title Page
In Item (57), under "ABSTRACT", in Column 1, Line 1, delete "such a" and insert --such as--
In Item (57), under "ABSTRACT", in Column 1, Line 9, delete "toe" and insert --the--
On Page 2, in Item (56), in Column 2, Line 4, delete "SGPP" and insert --3GPP--
On Page 2, in Item (56), under "OTHER PUBLICATIONS", in Column 2, Line 12, delete "2022. 6" and insert --2022, 6--

In the Specification
In Column 3, Lines 44-45, delete "such a" and insert --such as--
In Column 5, Line 10, delete "spacse/search" and insert --space/search--
In Column 6, Line 11, delete "DCII." and insert --DCI1.--
In Column 6, Line 58, delete "DCIX" and insert --DCIx--
In Column 7, Line 55, delete "DCIX" and insert --DCIx--
In Column 7, Line 60, delete "DCIX" and insert --DCIx--
In Column 8, Line 53, delete "DCIX" and insert -- -DCIx--
In Column 8, Line 61, delete "DCIX" and insert --DCIx--
In Column 10, Line 53, delete "more them." and insert --more of them.--

In the Claims
In Column 12, Line 33, in Claim 3, delete "(HARD)" and insert --(HARQ)--

Signed and Sealed this
Eleventh Day of June, 2024

Katherine Kelly Vidal
*Director of the United States Patent and Trademark Office*